United States Patent [19]

Sagi et al.

[11] Patent Number: 4,910,037

[45] Date of Patent: Mar. 20, 1990

[54] TEMPERING ACCELERATOR AND USE THEREOF IN CHOCOLATE

[75] Inventors: Nobuo Sagi, Izumisano; Hiroyuki Mori, Sakai, both of Japan

[73] Assignee: Fuji Oil Company, Limited, Osaka, Japan

[21] Appl. No.: 198,841

[22] Filed: May 26, 1988

[30] Foreign Application Priority Data

May 29, 1987 [JP] Japan ................... 62-136529

[51] Int. Cl.[4] .............................................. A23G 1/00
[52] U.S. Cl. ................................. 426/601; 426/607; 426/660
[58] Field of Search ............... 426/601, 602, 607, 609, 426/660

[56] References Cited

U.S. PATENT DOCUMENTS 3,892,880  7/1975  Grolitsch ..................... 426/609
4,588,604  5/1986  Baker et al. ................. 426/601

OTHER PUBLICATIONS

Chocolate, Cocoa and Confectionery: Science and Tech., 2nd ed, Minifie, B. W., AVI Publishing Co., 1980 (p. 147).

*Primary Examiner*—Donald E. Czaja
*Assistant Examiner*—D. Workman
*Attorney, Agent, or Firm*—Wenderoth, Lind & Ponack

[57] ABSTRACT

A powdery tempering accelerator which comprises a powder of stable crystals of a fat or oil composed of as a main component a 1,3-saturated-2-unsaturated triglyceride the total carbon atoms of the constituent fatty acid residues of which are 50 to 56. A method for using thereof in chocolate is also disclosed.

4 Claims, 1 Drawing Sheet

TEMPERING ACCELERATOR AND USE THEREOF IN CHOCOLATE

FIELD OF THE INVENTION

The present invention relates to a tempering accelerator which is useful for omitting or simplifying the tempering operation (adjusting a temperature) in the production of oily compositions such as chocolate and a method for using thereof.

BACKGROUND OF THE INVENTION

Tempering is an important step in the production of oily compositions such as chocolate, nut paste, margarine and the like. Tempering is effected so that a solidified product can be readily released from a mold due to formation of fine crystal nuclei when solidifying. Thereby, a product having good properties such as excellent gloss, luster, mouth feel and the like can be obtained (see, for example, Japanese Patent Kokai No. 61-40750).

However, in general, a tempering operation is troublesome and there is a tendency to omit a tempering operation. For this purpose, there has been used a hard butter having a high elaidin content, a hard butter wherein the fatty acid arrangement is randomized by interesterification, or a lauric hard butter. However, miscibility of these hard butters with cacao butter is limited and, thereby, taste and flavor of a resulting product are also limited.

Further, regarding a method for tempering, there are optimum conditions for each production depending upon the particular kind of a hard butter used, its composition and oil content as well as the presence of milk solid but it is not always easy to find out the suitable conditions. Furthermore, almost all refrigerators used for tempering have relatively little versatility, and are assembled so that they are adapted to a specific cooling rate. Accordingly, the degree of tempering of chocolate should be adjusted based on a particular type of a refrigerator to be used, and it is often experienced that a particular tempering style should be preliminarily found out (M. G. Reade, The Manufacture Confectioner/-January 1985).

Thus, there have been employed various methods for tempering. However, in general, tempering usually involves at least one step for force-cooling a molten oily composition and at least one step for reheating it (see, for example, "Seika Jiten" page 459, October, 1981, published by Asakura Shoten). It is clear that the loss of energy becomes generally greater, when both cooling and subsequent heating are effected in a single apparatus. Therefore, it is necessary to install two kinds of apparatuses for cooling and heating (Japanese Patent Kokai No. 61-40750). If tempering could be effected only by cooling, the process would be very advantageous from the view point of decreasing the number of process steps as well as with respect to energy and apparatuses. Further, if the tempering manner can be standardized regardless of the kind of chocolate or refrigerator, the range necessary to conduct a preliminary study in a particular tempering style can be limited and this is very convenient from the practical view point.

OBJECTS OF THE INVENTION

The present inventors have studied intensively, and have found a tempering accelerator which can solve the problem is miscibility with cacao butter and is useful for omitting, simplifying or standardizing the tempering operation. That is, one object of the present invention is to provide a powdery tempering accelerator which is useful for omitting, simplifying or standardizing the tempering operation.

Another object of the present invention is to provide a method for using the tempering accelerator. These objects as well as other objects and advantages of the present invention will become apparent to those skilled in the art from the following description with reference to the accompanying drawings.

SUMMARY OF THE INVENTION

Figure 2:
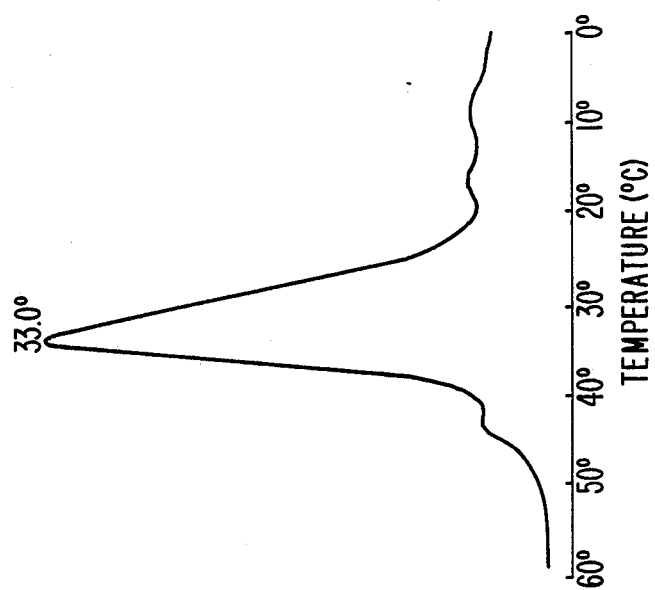
FIGS. 1 and 2 are differential scanning calorimeter (DSC) charts of chocolate just after casting in a mold and after cooling at 15° C. for 30 minutes in Example 4 hereinafter, respectively.

According to the present invention, there is provided a powdery tempering accelerator which comprises a powder of stable crystals of a fat or oil composed of as a main component a 1,3-saturated-2-unsaturated triglyceride the total carbon atoms of the constituent fatty acid residues of which are 50 to 56.

The method for using the tempering accelerator comprises adding the accelerator to an oily composition during a cooling step of its production without melting.

DETAILED DESCRIPTION OF THE INVENTION

The tempering accelerator of the present invention comprises a fat or oil composed of as a main component a 1,3-saturated-2-unsaturated triglyceride the total carbon atoms of the constituent fatty acid residues of which are 50 to 56, and the glyceride should be a powder of stable crystals thereof. When the total carbon atoms are less than the above range, the melting temperature of the triglyceride is too low, even it is in the form of stable crystals. And, the triglyceride easily dissolves in the oily composition to be subjected to tempering and thereby, the desired effect of acceleration of tempering can hardly be achieved. More total carbon atoms are more preferred. For example, a fat or oil being rich in 2-oleyl-palmito-stearin which has total carbon atoms of 52 is more preferred than a fat or oil being rich in 2-oleyl-dipalmitin which has total carbon atoms of 50. A fat or oil being rich in 2-oleyl-distearin having 54 total carbon atoms and that being rich in 2-oleyl-stearyl-alachidin having 56 total carbon atoms are much more preferred. Further, when an accelerator comprising a triglyceride the constituent fatty acid at 2-position of which is also a saturated fatty acid, i.e., a trisaturated triglyceride which is readily obtained from a completely hydrogenated hardened oil, is used instead of that comprising a 1,3-saturated-2-unsaturated glyceride, good crystal growth can not be accelerated, which results in, for example, difficulty in release of the oily composition subjected to tempering from a mold after cooling and, even if released, inferior gloss. Furthermore, in the case of an isomer glyceride, i.e., 1,2- or 2,3-saturated-3- or 1-unsaturated glyceride, good crystal growth can not be accelerated, either.

The fat or oil composed of as the main component the 1,3-saturated-2-unsaturated triglyceride wherein the total carbon atoms of the constituent fatty acid residues are 50 to 56 can be prepared from a natural fat or oil such as cacao butter, mowrah butter, illipe butter, shea fat, sal fat, allanblackia fat, mango fat, kokum fat and the like or by fractionating and purifying it. Or, it can be prepared by selectively introducing a saturated fatty acid into 1- and 3-positions of a fat or oil being rich in a triglyceride wherein the constituent fatty acid at 2-position is an unsaturated fatty acid (see, for example, Japanese Patent Kokai Nos. 52-104506, 55-71797 or 56-127094) and fractionating and purifying it, or by chemical synthesis. Generally, when the purity of the above specific triglyceride contained in the powdery fat or oil accelerator is higher, a good result can be more readily obtained, and the purity is preferably more than 50% by weight, more preferably more than 70% by weight.

The above fat or oil should be in the form of a powder of stable crystals. The term "stable crystals" used herein means a crystal form showing at least 4 peaks of a short lattice spacing (side lattice spacing) in a X-ray diffraction spectrum. Preferably, the crystal form is preferably IV form or more stable form, more preferably, V form or more stable form of the cacao butter crystal forms as designated by R. L. Wille and E. S. Lutton [J.A.O.C.S., 43, 491–496 (1966)]. If the above fat having the specific composition is not in the form of stable crystals, the accelerating effect of tempering is scarcely achieved. If it is used in the form of a liquid, it is difficult to release a product from a mold, unless a conventional tempering is effected. Further, even in the case that a product is used in enrobing, fat blooming is immediately caused.

The stable crystal form can be obtained by aging the triglyceride at a temperature lowr than about its melting point (particularly, the melting point of its stable crystal form) for a certain period of time. This aging period can be shortened by using the triglyceride fat in the form of a finely divided state, for example, a powder. Further, in general, crystals obtained by forming a micelle of a triglyceride with a solvent (e.g., an organic solvent such as hexane, acetone, etc., a supercritical gas) and deposited therefrom are stable even without aging and therefore such crystals can be used as the stable crystals in the present invention by removing the solvent from the deposited crystals while preventing melting the crystals (e.g., removal of the solvent under vacuum).

The powder particles can be formed by, for example, spraying the desired molten fat from a spray dryer at a certain temperature, or pulverizing the solid fat in the form of masses or coarse particles alone or together with a dispersion medium described hereinafter. However, in the case that the solid fat has been already in the form of stable crystals, it is preferred to carry out pulverization under a low temperature atmosphere at which the crystals are not molten, for example, by cooling with dry-ice.

The average particle size of the crystal powder is not more than 500μ, preferably not more than 100μ, more preferably not more than 40μ. When the particle size is too large, tempering can not be effectively accelerated because of a decrease in the number of nuclei which accelerates crystallization, or dispersion in the oily composition becomes inferior and, in some cases, the particles adversely effect mouth feel and impair edible properties of a product. When the particle size is small, the amount to be used may be decreased. However, attention should be given so as to prevent particles from melting due to a high temperature at addition thereof to a mix as described hereinafter.

The tempering accelerator of the present invention can contain other powder as a dispersion medium and, when dispersibility is improved, the effect of addition of the accelerator is further enhanced. The dispersion medium is preferably selected from a powder ingredient which can be used as a composition to be subjected to tempering. That is, in the case that a chocolate mix is subjected to tempering, the dispersion medium is powder selected from ingredients of a chocolate mix such as saccharides, milk powder, cacao mass, cocoa powder, an emulsifying agent and the like. Since, usually, the accelerator is passed through a refiner after addition thereof to a chocolate mix, the particle size of the dispersion medium is preferably not more than 50μ so as to prevent impairment of mouth feel of a product.

In the method for using the tempering accelerator mentioned above, the accelerator is added during a solidification step with cooling of a molten oily composition while preventing melting of the accelerator.

The oily composition can be mixed with materials for chocolate, nut paste, margarine and the like. The term "chocolate" used herein is not limited to chocolate which contains more than a specific amount of cacao butter such as that prescribed by laws and regulations, and includes any kind of chocolate such as that using a hard butter other than cacao butter. Examples of chocolate using a hard butter other than cacao butter include those obtained by using a so-called non-tempering type hard butter such as a lauric hard butter, a high-elaidin hard butter or a hard butter obtained by non-selective interesterification which does not require any tempering as well as a 1,3-disaturate-2-unsaturated type hard butter. According to the present invention, it is possible to produce chocolate by using a tempering type hard butter together with a non-tempering type hard butter in any mixing proportion including that resulting viscosity increase or blooming which make the production impossible according to a conventional manner. Therefore, a considerably large amount of a cheap non-tempering type hard butter, i.e., 20 to 80%, preferably 50 to 80% by weight based on the fat ingredient of chocolate can be used with maintaining good cacao fat flavor. This is quite advantageous to chocolate production.

Addition of the accelerator is carried out during solidification with cooling of the oily composition and therefore it is preferred to make this addition at a temperature lower than that at which the oily composition (mix) is in a fully molten state (usually, 40° C. or higher). Further, addition of the accelerator should be made in such a manner that the accelerator is not molten due to heat of the oily mix and therefore the accelerator is added at a temperature lower than that at which the accelerator is fully molten within a short period of time. In this manner, any reheating process is not required and it is possible to cast in a mold or to use it in enrobing immediately after dispersion of the accelerator in a chocolate mix. Therefore, if a temperature at which the accelerator is added is within the specified range, tempering can be simplified and, in fact, omitted. On the other hand, if a temperature at which the accelerator is added is higher, the accelerator is liable to melt and an additional amount of the accelerator and quick dispersion thereof are required. Therefore, the temperature should be selected by taking into consideration the balance thereof. In general, if the total carbon atoms of the fatty acid residues which constitute the triglyceride are larger, the temperature can be made higher. Addition of the accelerator can be made in so far as the oily composition (mix) is lost fluidity thereof by over cooling.

Additionally, in the present invention, chocolate can be produced according to the same manner as described above even by using a non-tempering type fat in an amount of 20 to 80% by weight based on the fat ingredient of chocolate.

Usually, the accelerator can be added to a chocolate mix in an amount of 0.005 to 10% by weight as the weight of the stable crystal powder of the triglyceride based on the total amount of the fat content in the oily composition. When the amount of addition is too small, the desired effect can hardly achieved and, when the amount is too large, the effect can not be increased.

After addition and dispersion of the accelerator, the resulting chocolate products can be treated according to a conventional manner such as depositing, casting or enrobing. In this regard, according to the present invention, severe temperature control of a hopper, a piston, and a cylinder of a depositor as well as a tempering mold which is required in a conventional chocolate production is not required.

The following Examples and Reference Examples further illustrate the present invention in detail but are not to be construed to limit the scope thereof. In the Examples and Reference Examples, all "parts" and "%'s" are by weight unless otherwise stated.

EXAMPLE 1

A high melting point fraction was obtained from Allanblackia extracted oil in the yield of 59.1%. Then, the fraction was aged for a long period time, frozen in liquid nitrogen and pulverized to obtain a stable crystal powder (average particle size: 11.4μ) [corresponding to V form designated by the above R. L. Wille and E. S. Lutton as shown by identification X-ray diffraction (Cu−K α, λ=1.542)]

EXAMPLE 2

Stearic acid ethyl ester and high oleic sunflower oil were subjected to selective interesterification of 1,3-positions of glycerides by using lipase and the resulting interesterified oil was fractionated and concentrated by using a solvent. The fat thus obtained was recrystallized from hexane and the solvent was removed with preventing melting the crystals by a vacuum pump. Then, the fat was pulverized with cooling by dry-ice in a mixer and passed through a screen to obtain an accelerator having a particle size of 42 to 60 mesh pass (350 to 250μ). The crystal form of this additive was corresponding to the VI form according to the above designation method.

EXAMPLE 3

A powder was obtained from molten cacao butter by utilizing a spray-dryer. The resulting powder was aged, frozen in liquid nitrogen and pulverized to obtain a stable crystal powder (the above V form) having a particle size of 14.9μ.

The chemical constants (IV and AV), the fatty acid composition (in the following Table 1, for example, "C 18:1" means a fatty acid having 18 carbon atoms with 1 double bond), the melting point (a powder sample was placed in a glass capillary having about 5 mm in length and an inner diameter of about 1 mm one end of which was sealed and the capillary was attached to the bulb of a thermometer so that the sealed part was directed to downward. The melting point was measured on a water bath with rising temperature) and HPLC analysis (in the following Table 1, "DG" means diglyceride) of each of accelerators obtained in Examples 1 to 3 are shown in Table 1.

TABLE 1

| Example | | 1 | 2 | 3 |
|---|---|---|---|---|
| Chemical constant | IV | 29.9 | 30.5 | 36.8 |
| | AV | 0.35 | 0.04 | 2.1 |
| Fatty acid composition | C16:0 | 0.6 | 3.4 | 25.5 |
| | C18:0 | 64.1 | 61.0 | 33.5 |
| | C18:1 | 35.2 | 31.9 | 36.4 |
| | C18:2 | — | 2.4 | 4.0 |
| | C20:0 | 0.1 | 0.7 | 0.5 |
| | C22:0 | — | 0.6 | — |
| Melting point (°C.) | Beginning of melting | 42.4° C. | 40.7° C. | not measured |
| | Completion of melting | 43.6° C. | 41.3° C. | |
| HPLC analysis | DG others | 2.1 | 3.8 | 0.8 |
| | POO | | | 2.9 |
| | PLP | | | 2.1 |
| | PLS | | | 3.8 |
| | POP | | | 16.1 |
| | SOO | 2.2 | | 3.6 |
| | POS | 2.1 | 16.3 | 40.1 |
| | SLS | | | 1.7 |
| | SOS | 91.2 | 75.3 | 26.8 |
| | PPS | 0.7 | 1.8 | 0.4 |
| | PSS | 0.7 | 1.8 | 0.5 |
| | SSS | 0.7 | 1.8 | |
| | AOS | 1.7 | 1.4 | 1.2 |
| | BOS | | 1.4 | |

EXAMPLE 4

Chocolate was produced by using the accelerator of Example 1 or 3. That is, a molten chocolate mix of the following formulation was prepared according to a conventional manner by mixing the ingredients and refining and conching the mixture. The mix was cooled to 30° C. and 5% of the above accelerator based on the fat content of the mix (1.67% based on the chocolate mix) was added thereto with stirring and dispersed. Then, the mixture was cast in a mold and solidified by standing at 15° C. for 30 minutes.

For comparison, according to the same manner as described above, chocolate products were produced except that no accelerator was added and the chocolate mix obtained was cast in a mold at 30° C. (Reference Example 1); or the accelerator of Example 1 was admixed with the other ingredient before refining and conching to prepare a molten chocolate mix (Reference Example 2).

| Formulation of chocolate | | |
|---|---|---|
| Powdered sugar | 44.5% | |
| Whole milk powder | 20.0% | |
| Cacao butter | 19.8% | 100 parts |
| Cacao mass | 15.7% | |
| Lecithin | 0.5 parts | |

Figure 1:
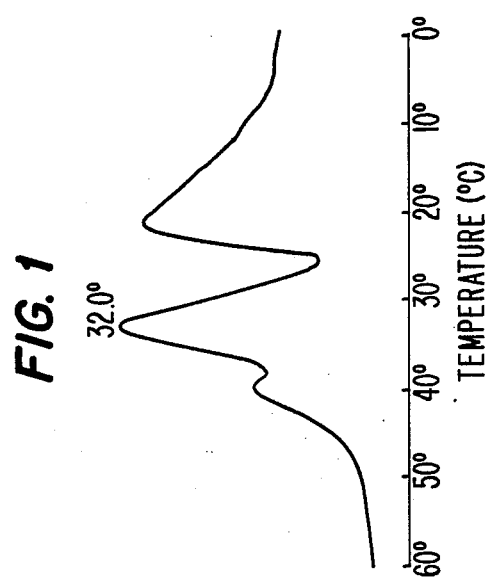

A sample of the chocolate of this Example 4 using the accelerator of Example 1 was obtained at the time when the chocolate cast in a mold at 30° C. and analyzed by DSC analysis (collecting the sample (30 to 40 mg) in an aluminum sample pan and setting it in a DSC sample chamber together with a control pan containing no sample, quickly freezing the chamber to −40° C. with dry-ice, and then electrically measured absorbed calorie with rising temperature at the rate of 5° C./min). Likewise, a sample of the chocolate obtained after cooling at 15° C. for 30 minutes was analyzed. The resulting data are shown in the accompanying drawings (FIGS. 1 and 2). It is clearly shown that stable crystals of the chocolate are rapidly formed. Then samples of Reference Example 2 wherein the acelerator of Example 1 was added were subjected to DSC analysis according to the same manner. However, the peak at about 40° C. is not observed in both samples obtained at the time the chocolate mixture was cast in a mold, and at the time the chocolate mixture was solidified by standing at 15° C. for 30 minutes after casting in a mold.

Releasing properties and gloss of each chocolate products are shown below.

| Accelerator | Mean particle size (μ) | Releasability and Gloss* |
|---|---|---|
| Ex. 1 | 11.4 | A |
| Ex. 3 | 14.9 | A |
| no accelerator (Reference Ex. 2) | | C |
| Ex. 1 (Reference Ex. 1) | • | C |

[Note]
*A: readily released with one or two tapping and good gloss
B: released with 3 to 4 tapping but partial presence of a stripe pattern on the surface
C: difficult to release even with tapping

EXAMPLE 5

According to the same manner as described in Example 4, a chocolate product was produced except that the accelerator of Example 2 was used as it is, or the accelerator obtained by mixing the accelerator of Example 2 with powdered sugar in the proportion by weight of 1:1, freezing in liquid nitrogen and pulverizing (average particle size of not more than about 20μ) was used. Both resulting chocolates showed good release properties and gloss. However, the chocolate obtained by casting the accelerator of Example 2 was inferior in dispersibility and white granular state was observable by the naked eye on the broken surface thereof.

EXAMPLE 6

According to the same manner as described in Example 4, the product was produced except that the accelerator of Example 1 was dispersed in a chocolate mix of the following formulation. When cake was enrobed with the resulting chocolate product and cooled, the product was quickly dried to give good gloss.

According to the same manner, a product (Reference Example) was produced except that the tempering accelerator was molten and admixed with the chocolate mix. In this case, fat blooming was caused immediately after cooling.

| Formulation of chocolate | | |
|---|---|---|
| Powdered sugar | 41.0% | |
| Whole milk powder | 8.1% | |
| Skim milk powder | 5.0% | |
| Cacao butter | 35.0% | 100 parts |
| Cacao mass | 8.9% | |
| Cocoa powder | 2.0% | |
| Lecithin | 0.5 parts | |

EXAMPLE 7

According to the same manner as described in Example 2, a solvent-removed, unpulverized accelerator was obtained. This was admixed with powdered sugar in the weight ratio of 1:1 and frozen-pulverized in liquid nitrogen to obtain powder having an average particle size of about 20μ or finer. According to the same manner as described in Example 4, chocolate was obtained except that the resulting powder was added in an amount of 1 to 0.01% by weight based on the fat ingredient (accelerator: 0.5 to 0.005% by weight based on the fat ingredient). All chocolates thus obtained had good release properties from the mold and good gloss.

EXAMPLE 8

| Formulation of chocolate | | |
|---|---|---|
| Powdered sugar | 38.0% | |
| Whole milk powder | 7.0% | |
| Cacao mass | 30.0% | 100 parts |
| Palm oil | 20.0% | |
| Cocoa powder | 5.0% | |
| Lecithin | 0.5 parts | |
| Flavor | small amount | |

The above chocolate mix was cooled to 30° C. and added thereto the accelerator of Example 1 in an amount of 0.1% by weight as calculated as the crystalline powder based on the fat ingredient of the mix. The mixture was cast in a mold and solidified by standing at 8° C. for 30 minutes. This chocolate had good release property form the mold and good gloss.

When a conventional tempering was carried out without addition of the accelerator, viscosity was remarkably increased, which made the tempering difficult. And, the product had inferior release property and gloss.

EXAMPLE 9

| Formulation of chocolate | | |
|---|---|---|
| Powdered sugar | 45.0% | |
| Whole milk powder | 14.0% | |
| High elaidin content hard butter (Melano STM) | 21.0% | 100 parts |
| Cacao mass | 20.0% | |
| Lecithin | 0.5 parts | |
| Flavor | small amount | |

The above chocolate mix was cooled to 30° C. and added thereto the accelerator of Example 1 in an amount of 0.1% by weight as calculated as the crystalline powder based on the fat ingredient of the mix. The mixture was cast in a mold and solidified by standing at 5° C. for 30 minutes. This chocolate had good release property form the mold and good gloss.

The production was repeated without addition of the accelerator (Reference Example 3).

Each chocolate obtained was stored at 20° C. for 1 week. Then, the chocolate was subjected to a cycle test wherein the chocolate was stored at 17° C. for 12 hours and then at 30.5° C. for 12 hours and this cycle was repeated. As the result, in the chocolate of Reference Example 3, blooming was observed after 4 weeks, whereas, even after 2 months, no blooming was observed in the chocolate of Example 9.

What is claimed is:

1. A powdery tempering accelerator for chocolate which comprises a powder of stable crystals of a fat or oil composed of not less than 50% by weight of a 1,3-saturated-2-unsaturated triglyceride, wherein the triglyceride has constituent fatty acid residues which have a total number of carbon atoms of from 50 to 56, and wherein the powder has an average particle size of not more than 500μ.

2. A powdery tempering accelerator according to claim 1, wherein the accelerator further includes a dispersion medium.

3. A powdery tempering accelerator according to claim 2, wherein the dispersion medium is at least one powdery ingredient of chocolate selected from the group consisting of saccharides, milk powder, cacao mass and cocoa powder.

4. A method for using a tempering accelerator in chocolate production which comprises adding a tempering accelerator to a molten mixture of chocolate ingredients, the tempering accelerator comprising powder particles of stable crystals of a fat or oil composed of not less than 50% by weight of a 1,3-saturated-2-unsaturated triglyceride, the triglyceride having constituent fatty acid residues which have a total number of carbon atoms of from 50 to 56, the powder particles having an average particle size of not more than 500μ and being added in an amount of from 0.005 to 10% by weight of the weight of said stable crystals based on the total amount of the fat content in said mixture of chocolate ingredients, wherein the tempering accelerator is added to the molten chocolate ingredients during a cooling step thereof and at a temperature lower than 40° C. so as to prevent melting of the powder particles and no reheating is conducted.

* * * * *